`US010437009B2`

United States Patent
Staley et al.

(10) Patent No.: US 10,437,009 B2
(45) Date of Patent: Oct. 8, 2019

(54) MOUNT FOR FLAT OPTICAL SURFACE

(71) Applicant: Semrock, Inc., Rochester, NY (US)

(72) Inventors: Arthur R. Staley, Webster, NY (US); James R. Kircher, Mendon, NY (US); Craig W. Hodgson, Pittsford, NY (US)

(73) Assignee: SEMROCK, INC., Rochester, NY (US)

( * ) Notice: Subject to any disclaimer, the term of this patent is extended or adjusted under 35 U.S.C. 154(b) by 122 days.

(21) Appl. No.: 15/585,243

(22) Filed: May 3, 2017

(65) Prior Publication Data
US 2018/0321463 A1    Nov. 8, 2018

(51) Int. Cl.
| G02B 7/182 | (2006.01) |
| G02B 5/18 | (2006.01) |
| G02B 27/14 | (2006.01) |
| G02B 7/00 | (2006.01) |

(52) U.S. Cl.
CPC ............ *G02B 7/182* (2013.01); *G02B 7/006* (2013.01); *G02B 7/1825* (2013.01); *G02B 7/1828* (2013.01); *G02B 27/141* (2013.01)

(58) Field of Classification Search
CPC .......... G02B 7/182; G02B 7/00; G02B 7/006; G02B 7/02; G02B 7/026; G02B 7/008; G02B 5/18; G02B 5/08; G02B 27/14; G02B 27/141; G02B 7/1825; G02B 7/1828
USPC ........ 359/566, 838, 847–849, 811, 818, 819, 359/871, 872
See application file for complete search history.

(56) References Cited

U.S. PATENT DOCUMENTS

| 4,929,073 | A |   | 5/1990 | LaPlante et al. |
| 5,530,547 | A |   | 6/1996 | Arnold |
| 5,537,208 | A |   | 7/1996 | Bertram et al. |
| 6,631,035 | B2 |   | 10/2003 | Iikawa et al. |
| 6,729,589 | B2 |   | 5/2004 | Shelef |
| 6,781,753 | B2 |   | 8/2004 | Gunderson |
| 7,307,688 | B2 | * | 12/2007 | Ottens ................ G03F 7/70058 355/53 |
| 7,410,265 | B2 |   | 8/2008 | Antoni et al. |
| 7,463,435 | B1 |   | 12/2008 | Arnold |
| 9,229,192 | B2 |   | 1/2016 | Someya et al. |
| 2005/0128607 | A1 | * | 6/2005 | Schaffer ............. G03F 7/70825 359/819 |
| 2006/0104595 | A1 |   | 5/2006 | Arnone |

* cited by examiner

*Primary Examiner* — Jie Lei
(74) *Attorney, Agent, or Firm* — Louis S. Horvath

(57) ABSTRACT

An optical apparatus has an optic having a first flat surface and a second surface opposite the first flat surface. A frame has a first fixed contact point, a second fixed contact point, and a third fixed contact point that extend from the frame. The first surface of the optic seats against the first, second, and third fixed contact points. A clamping plate applies a three-point nesting force by extending, against the second flat surface of the optic, a first opposing contact point aligned with the first fixed contact point, a second opposing contact point aligned with the second fixed contact point, and a third opposing contact point aligned with the third fixed contact point.

20 Claims, 15 Drawing Sheets

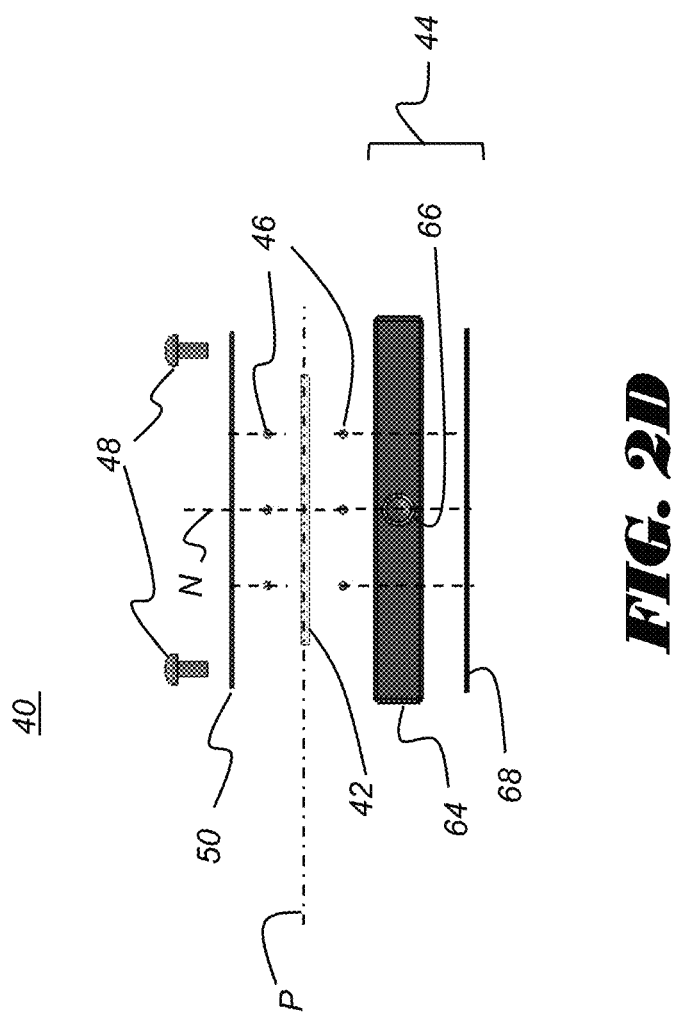

MOUNT FOR FLAT OPTICAL SURFACE

FIELD OF THE INVENTION

This disclosure generally relates to optical mount apparatus and more particularly to an optical mount for maintaining an optical surface in conformance to a plane.

BACKGROUND OF THE INVENTION

Thin film interference filters are one type of flat optical component widely used in systems for optical measurement and analysis, such as Raman spectroscopy and fluorescence imaging, for example. Thin film interference filters, including optical edge and band pass filters, notch filters, and laser line filters (LLFs) are advantageously used in such systems to transmit light having specific wavelength bands and to reflect other light, including light that could otherwise constitute or generate spurious optical signals and swamp the signals to be detected and analyzed. Dichroic beam splitters utilize interference filter effects to reflect certain wavelengths or ranges of wavelengths and transmit other wavelengths or ranges of wavelengths.

Failure or poor performance of such filters compromises the performance of systems in which they are used. Considerable design effort and expertise are required to fabricate thin film interference filters of high quality. Conventional design approaches for optical instruments that utilize thin-film filters are often constrained by inherent characteristics of these filters and long-standing practices for how these filters are designed and used.

A particular concern relates to maintaining the optical surface so that it lies as flat as possible. The surface flatness of dichroic beam splitters, for example, affects a number of factors in the performance of a fluorescence microscopy system. For light incident at high angles of incidence, such as the 45 degree angle of incidence (AOI) typically used for a dichroic surface, the beam axis for transmitted light can be slightly laterally shifted relative to the axis of incoming light to the surface. Furthermore, if both opposite surfaces of the dichroic are appreciably curved, such that the dichroic filter has the shape of a bent parallel plate, the beam axis for transmitted light can be slightly diverted and therefore non-parallel to the axis of incoming light to the surface.

Light reflected from a tilted surface presents even more of a problem for dichroic filters as well as for precision reflective surfaces in general. For example, unless the reflective surface is flat to within close tolerances, the focus of an excitation beam from a light source can be shifted along the axis away from the focal plane of the focusing lens and the size of the focused point can be compromised. Similarly, the focal plane of the emitted light that is reflected by a dichroic beam splitter can be shifted along the axis of light away from its intended detector and the acquired image can be distorted.

There can be additional problems related to filter flatness with specific types of microscopy systems as well. For example, for a type of laser based fluorescence microscopy termed Total Internal Reflection Fluorescence or TIRF microscopy and for Structured Illumination microscopy, the relative flatness of the dichroic surface affects how well the measurement apparatus performs. If there is unwanted curvature of a dichroic beam splitter, the position of the focal plane can shift perceptibly and the size or shape of the focused spot change. Either of these two effects, or their combined effect, can significantly compromise the image quality obtained. Aberrations resulting from this focal shift and degradation may not be easy to correct and can adversely affect the overall imaging performance of the microscopy system.

Imperfect flatness can be a particular problem when using dichroic beam splitters with laser light, whether in microscopy or in other applications. For this reason, dichroic surfaces rated for use with lasers must meet higher standards for flatness and are more costly than dichroic surfaces that are used for other light sources.

Dichroic coatings are typically formed by thin film deposition techniques such as ion beam sputtering. These fabrication methods require deposition onto a flat substrate, but tend to add significant amounts of mechanical stress as they are applied. This stress, if not corrected in some way, can cause some amount of bending or warping of the underlying substrate, frustrating attempts to maintain suitable flatness. For this reason, many types of commercially available dichroic beam splitters encase the dichroic coating within a prism. Encasement solutions, however, present other problems, including practical difficulties in alignment, polarization splitting of spectral edges, the need for optical adhesives that can both withstand the optical and temperature environment while closely approximating the refractive index of the surrounding glass, and other shortcomings. The dichroic coating works best when it is disposed directly in the path of incident light; encasing the coating within glass or other substrate introduces optical problems, such as absorption and scattering, that can degrade optical performance.

Thus, there would be advantages to methods that would allow surface flatness for dichroic and other optical surfaces to be maintained within tight tolerances.

SUMMARY OF THE INVENTION

It is an object of the present disclosure to advance the art of optical mounting. With this object in mind, the present disclosure provides an optical apparatus comprising:
   an optic having a first flat surface and a second surface opposite the first flat surface;
   a frame having a first fixed contact point, a second fixed contact point, and a third fixed contact point that extend from the frame,
   wherein the first surface of the optic seats against the first, second, and third fixed contact points;
   and
   a clamping plate that applies a three-point nesting force by extending, against the second surface of the optic, a first opposing contact point aligned with the first fixed contact point, a second opposing contact point aligned with the second fixed contact point, and a third opposing contact point aligned with the third fixed contact point.

Additional features and advantages will be set forth in part in the description which follows, being apparent from the description or learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the embodiments, as claimed.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 2D is a side view that shows an alternate arrangement of the optical mount in exploded view form.

DETAILED DESCRIPTION OF THE INVENTION

Figure 1:
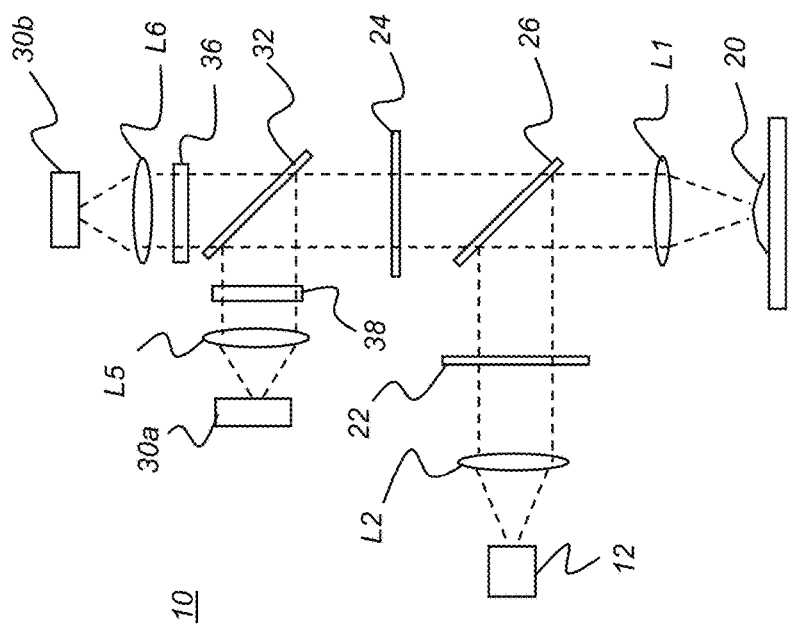
FIG. 1 is a schematic diagram showing optical paths within a fluorescence microscope.

It is to be understood that elements not specifically shown or described herein may take various forms well known to those skilled in the art. Figures shown and described herein are provided in order to illustrate key principles of operation and component relationships along their respective optical paths according to the present invention and are not drawn with intent to show actual size or scale.

Where they are used, the terms "first", "second", "third", "fourth", and so on, do not necessarily denote any ordinal or priority relation, but are simply used to more clearly distinguish one element from another.

Various relative terms such as "above," "below," "top," "bottom," "height," "depth," "width," and "length," etc. may be used in the present disclosure to facilitate description of various embodiments and to help distinguish one side or surface of a component or assembly from its opposite side or surface or to distinguish different views or dimensions. The relative terms are defined with respect to a conventional orientation of a structure and do not necessarily represent an actual orientation of the structure in manufacture or use. The following detailed description is, therefore, not to be taken in a limiting sense as to component orientation or configuration.

The term "surface" has its conventional meaning as used in geometry, indicating a planar face of an object, where the face is considered to have length and breadth, but without thickness. For an optical component, the surface can be treated to condition incident light or the light path, such as to reflect or filter light. The treatment can be on one surface or on its opposite surface, as well as on both surfaces. The term "edge" has its conventional meaning, denoting a border or margin where a surface ends, and can be considered to have thickness, but no length or breadth. The periphery of an optical surface can be considered to be that portion of the surface that lies along the edge and outside of the clear aperture.

The term "oblique" is used herein to refer to an angular relationship that is other than substantially orthogonal or parallel, that is, at least about 5 degrees from any integer multiple of 90 degrees.

In the context of the present disclosure, the terms "configured", "coated", or "formed" are used equivalently with respect to the fabrication of thin film filters designed to provide a particular spectral characteristic, also termed a "filter characteristic" in the context of the present invention. A surface is considered to be transmissive to a particular wavelength if it transmits at least 75 percent of the light that is incident at that wavelength. A surface is considered to reflect a given wavelength of incident light if it reflects at least 80 percent of the light that is incident at that wavelength.

The term "wavelength band" has its conventional meaning as is readily understood by those practiced in optical design, and refers to a continuous span of the electromagnetic spectrum that covers a continuous range of wavelengths.

In the context of the present disclosure, the following terms may be used interchangeably: "dichroic filter", "filter", "thin film filter", and "dichroic beam splitter". Embodiments of the present invention are directed to mounting apparatus for dichroic filters as well as to other types of flat optical surfaces, including mirrors, polarizers, diffraction gratings and other flat surfaces for which it is advantageous to provide a mount that maintains a high degree of flatness, so that the surface lies in a plane.

As an example of one type of system that relies heavily on thin-film filters and benefits from high performance filter design and flatness, the simplified schematic diagram of FIG. 1 shows one type of imaging apparatus that is used for analysis of spectral characteristics of a sample. A fluorescence microscopy system 10 has a light source 12 with an illumination lens L2 that directs a beam of excitation energy, within a specific wavelength range, through an objective lens L1 and toward a sample 20 for analysis. Optical fluorescence occurs when absorption of light of the excitation wavelength(s) causes emission of light at one or more longer wavelengths. A succession of filters 22, 24, and a dichroic beam splitter 26 are used to isolate and direct the different wavelength bands of excitation and emitted light, respectively, to and from sample 20. The image-bearing emitted light from the sample is split into two components using a beam splitter 32 that is disposed in the path of this light at a 45-degree angle. Beam splitter 32 reflects a first wavelength band through a filter 38 and a lens L5 to a first detector 30a to form a first image. Beam splitter 32 also transmits a second wavelength band through a filter 36 and a lens L6 and to a second detector 30b to form a second image. Detectors 30a and 30b can be any of a number of light-sensing devices, such as a camera or charge-coupled device (CCD). Given the exemplary optical system of FIG. 1, it can be appreciated that maintaining perfect or near-perfect surface flatness is highly desirable for beam splitters 26 and 32, as well as for other filters 22, 24, 36, and 38, for example.

Optical filters formed according to embodiments of the present invention generally employ the basic structure of a multilayer thin film interference filter as noted in the background section. In this basic structure, a plurality of discrete layers of material are deposited onto a surface of a substrate in some alternating or otherwise interleaved pattern as a filter stack, wherein the optical index between individual layers in the filter stack can change continuously, gradually, or abruptly. In conventional thin film designs, two discrete layers are alternated, formed with thicknesses very near the quarter-wavelength thickness of some fundamental wavelength. In embodiments of the present invention, the same basic pattern can be used, as well as the addition of a third or other additional materials in the thin film stack, as needed to fine-tune filter response.

A wide variety of materials may be used to form the plurality of discrete material layers in the filter stack. Among such materials, non-limiting mention is made of metals, metallic and non-metallic oxides, transparent polymeric materials, and so-called "soft" coatings, such as sodium aluminum fluoride ($Na_3AlF_6$) and zinc sulfide (ZnS). Further non-limiting mention is made of metallic oxides chosen from silicon dioxide ($SiO_2$), tantalum pentoxide ($Ta_2O_5$), niobium pentoxide ($Nb_2O_5$), hafnium dioxide ($HfO_2$), titanium dioxide ($TiO_2$), and aluminum trioxide ($Al_2O_3$).

In some embodiments, the plurality of interleaved material layers may include at least two distinct materials. As a non-limiting example, the filters according to the present disclosure may include a plurality of distinct alternating $Nb_2O_5$ and $SiO_2$ layers that have indices of refraction of 2.3 and 1.5, respectively. Alternatively, the filters in accordance with the present disclosure may use an interleaved pattern with at least three distinct materials, such as distinct $Nb_2O_5$, $SiO_2$, and $Ta_2O_5$ layers, each layer having a characteristic index of refraction. Of course, more than three materials and other combinations of materials may also be used within the interleaved layer pattern.

Generally, the filters in accordance with the present disclosure can be manufactured using deposition methods and techniques that are known in the art. For example, these filters may be made with a computer-controlled ion beam sputtering system, such as the one described in commonly assigned U.S. Pat. No. 7,068,430, entitled "Method of making highly discriminating optical edge filters and resulting products" to Clarke et al., which is incorporated herein by reference. In general, such a system is capable of depositing a plurality of discrete alternating material layers, wherein the thickness of each layer may be precisely controlled. According to an alternate embodiment of the present invention, material properties may change gradually, providing a rugate filter.

Filter designs in accordance with the present disclosure may be produced by known thin-film filter design techniques. For example, these filter designs may be produced by optimizing the filter spectra and structure of an initial design, such as a traditional short wave pass or long wave pass interference filter, against a target spectrum using known optical optimization routines. Non-limiting examples of such optimization routines include the variable-metric or simplex methods implemented in standard commercial thin-film design software packages, such as TFCalc by Software Spectra, Inc. of Portland, Oreg., and The Essential Macleod by Thin Film Center, Inc., of Tucson, Ariz. A detailed description of filter design techniques that can be used to produce filter designs according to the present disclosure may be found in the above-cited U.S. Pat. No. 7,068,430.

The background section of the present disclosure described some of the difficulties encountered in achieving good performance when using conventional dichroic filters as beam splitters, with particular reference to maintaining the desired surface flatness. To address the problem of maintaining surface flatness, the present disclosure describes a mounting apparatus that applies kinematic principles to position an optical surface along a plane with minimum constraint. Three points in space define a plane. By fixing the locations of three points along the optical surface, the mount provided by the Applicant allows orientation, adjustment, and handling of the optical surface to constrain unwanted movement and to maintain a high degree of flatness, to tolerances within a small fraction of a wavelength.

Figure 2B:
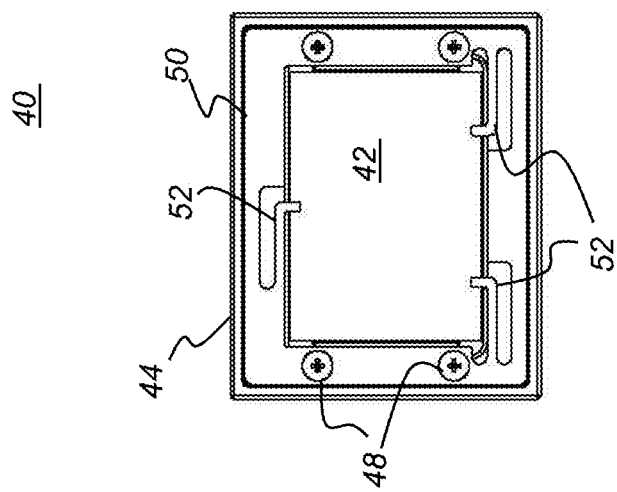
FIG. 2B is a top view that shows the optical mount of FIG. 2A.
Figure 2A:
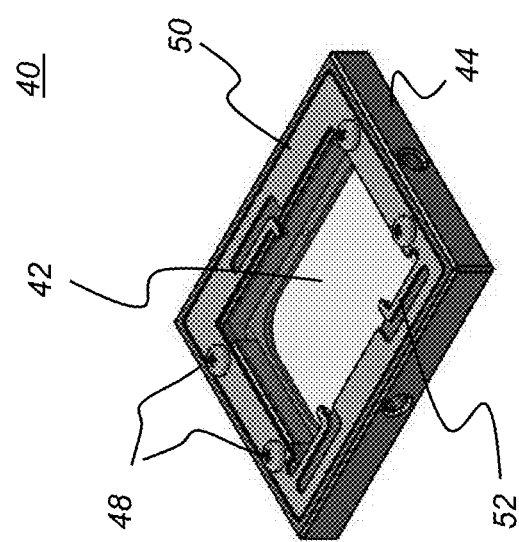
FIG. 2A is a perspective view that shows an optical mount according to an embodiment of the present disclosure.
Figure 2C:
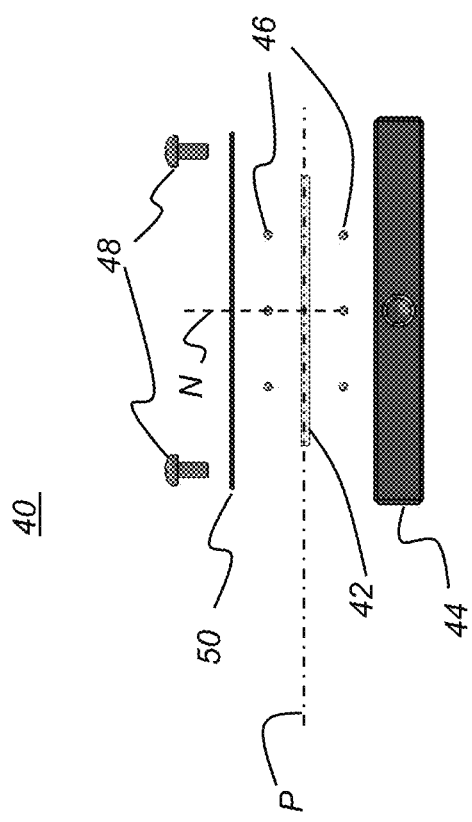
FIG. 2C is a side view that shows the optical mount of FIG. 2A in exploded view form.

The perspective view of FIG. 2A and top view of FIG. 2B show a mount 40 for a filter or other optical component having a flat surface according to an embodiment of the present disclosure. The side view of FIG. 2C shows, in exploded view form, how mount 40 can be assembled from its component parts for holding a filter 42. Filter 42 is a flat optical component. As noted in previous description, the same mount 40 arrangement can similarly be used where a mirror or other component, serving as an optic, has the relative plane P position of filter 42 for the description that follows. Mount 40 has a base frame 44 that defines an aperture for optical component placement. A substantial area about the center of the aperture is considered to be a clear aperture for light transmission, conditioning, or redirection along the optical path. A planar clamping plate 50 having leaf springs 52 or other suitable type of spring element is releasably coupled to base frame 44, such as using one or more fasteners 48. As shown in FIG. 2C, three pairs of opposed spheres 46 are arranged outside of the clear aperture to provide the three constraint points that define the plane P, extending across the clear aperture, in which filter 42 or other optic lies, as described in more detail subsequently. Each pair of opposed spheres 46 with respect to plane P defines a nesting force along a vector that is at a normal N to plane P.

According to an alternate embodiment for mount 40, as shown in cross section in FIG. 2D, base frame 44 is composed of multiple elements and has a spring plate 68 and a support member 64 that defines an optical aperture. In outline, spring plate 68 can be a mirror image of clamping plate 50, identical in form and outline, with three spheres 46 or other point contacts extended from clamping plate 50 and three matching point contacts extended from spring plate 68. Both support member 64 and filter 42 or other optic are then sandwiched between clamping plate 50 and spring plate 68 in assembly. Support member 64 can have flat or featured surfaces and can include one or more threaded cavities 66 to facilitate mounting. Additional fasteners can be used to couple spring plate 68 to support member 64.

Figure 3A:
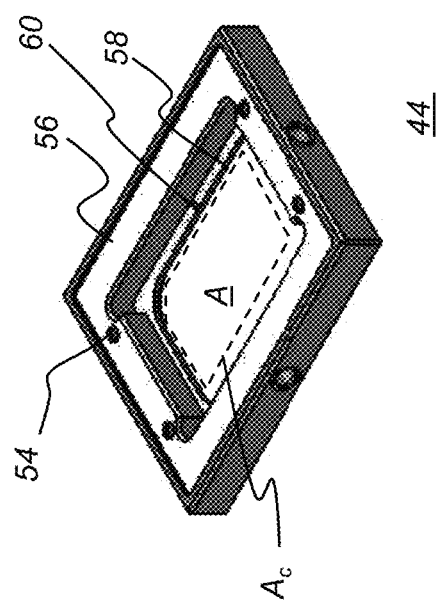
FIG. 3A is a perspective view that shows the base frame for the optical mount.
Figure 3C:
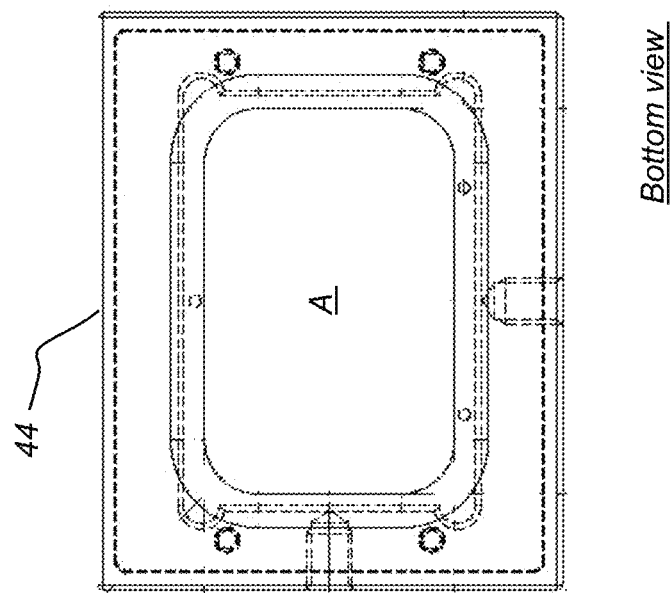
FIGS. 3B and 3C show top and bottom views, respectively, of the base frame.
Figure 3B:
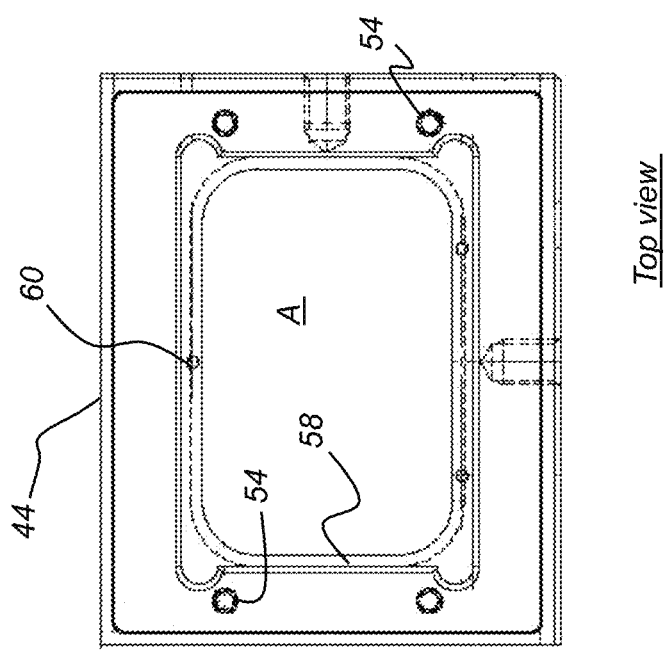

FIG. 3A is a perspective view that shows the base frame 44 for the optical mount. FIGS. 3B and 3C show plan views of base frame 44 from top and bottom, respectively. Base frame 44 defines an aperture A for transmitted light through filter 42. Within aperture A is a clear aperture $A_c$, shown in dashed outline in FIG. 3A. In the embodiment shown, a seating surface 56, lying outside of clear aperture $A_c$, provides a seat for placement and coupling of planar clamping plate 50 to base frame 44. One or more tapped holes 54 can be provided for fastening clamping plate 50 in position along seating surface 56. A shallow, recessed inner shelf 58, can be dimensioned to provide support against the periphery of a first surface of a flat component, providing a set of recesses 60, machined or otherwise featured for seating spheres 46 within base frame 44.

Figure 4A:
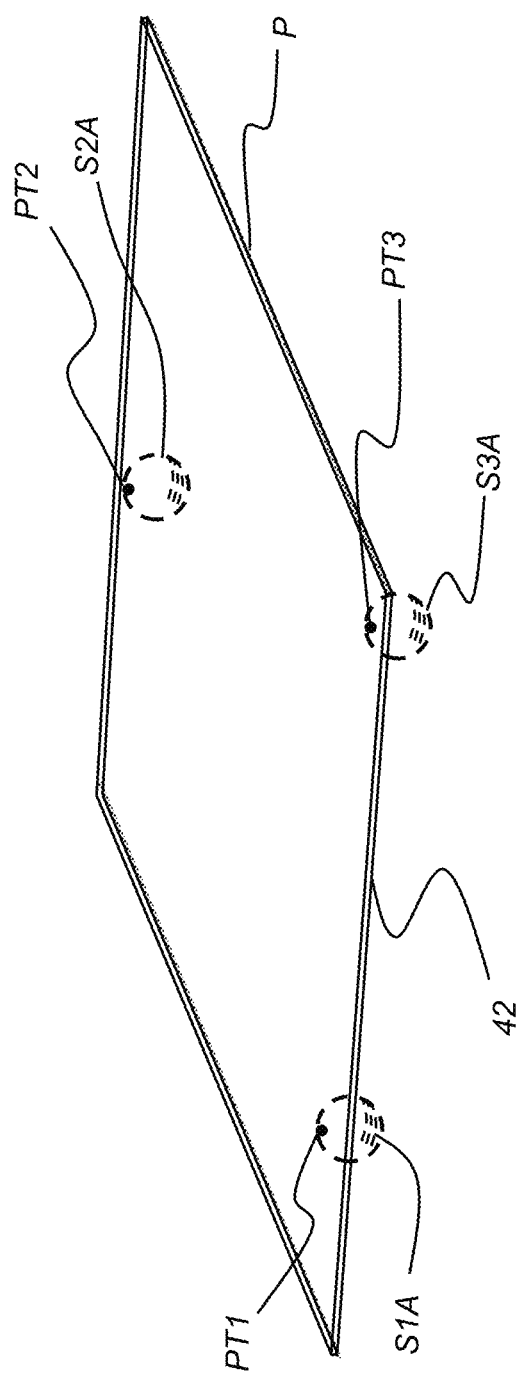
FIGS. 4A and 4B show a sequence that describes the clamping arrangement for a filter or other optical component.
Figure 4B:
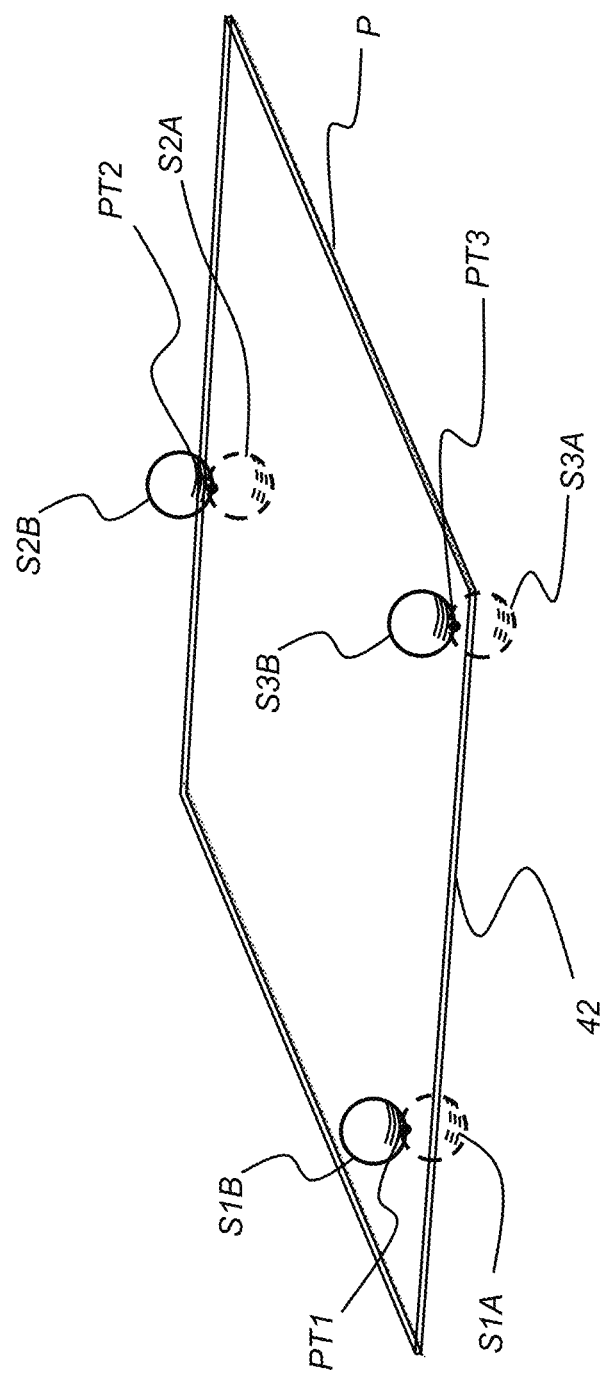

The sequence of FIGS. 4A and 4B shows how an embodiment of the present disclosure allows filter 42 or similar flat optical component to be supported for maintaining a fixed position and flat surface form using single-point contact without over-constraint. FIG. 4A shows a planar filter 42 with its bottom surface resting on 3 fixed contact points PT1, PT2, and PT3. Each of contact points PT1, PT2, and PT3 is defined at a corresponding point along the curved surface of a corresponding sphere S1A, S2A, and S3A, wherein the surface extends from the base frame 44 of mount 40. Each of the spheres S1A, S2A, and S3A can be seated against inner shelf 58, such as within a recess 60 drilled or otherwise formed in shelf 58 (FIG. 3B), and held in place by an adhesive or other coupling mechanism. This arrangement provides three fixed contact points that define the plane P in which the filter surface is constrained.

With this arrangement, contact points PT1, PT2, and PT3 on spheres S1A, S2A, and S3A define plane P in which the flat surface of filter 42 rests. FIG. 4B shows how clamping action can be provided using the opposed point-contact arrangement. As shown for spheres S1A and S1B in FIG. 4C, each of spheres S1B, S2B, and S3B, is aligned with its corresponding opposing sphere S1A, S2A, and S3A with respect to a normal N orthogonal to plane P. Normal N can be defined by the opposing spherical contact points on the first and corresponding second surfaces of the optical component. Differently stated, a nesting force vector parallel to normal N is aligned along, or extends through, the geometric center C of each of the paired spheres. With this alignment, the opposing centers C define a normal relative to the optical surface.

Figure 4C:
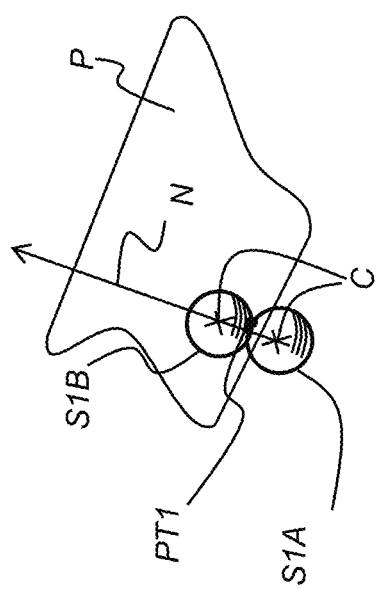
FIG. 4C shows how opposing spheres align to provide single-point clamping action.
Figure 5B:
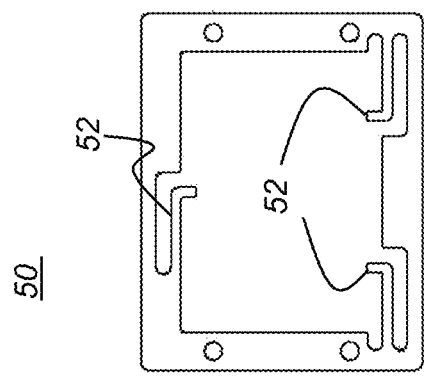
FIG. 5B is a plan view of the clamping plate.
Figure 5A:
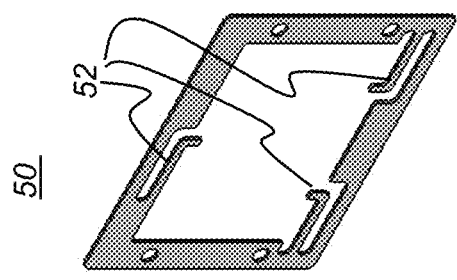
FIG. 5A is a perspective view that shows a clamping plate having a set of leaf springs.

In order to provide the idealized geometry shown with respect to FIGS. 4A-4C, an embodiment of the present disclosure provides clamping plate 50, as described previously in the assembled views of FIGS. 2A and 2B and as shown in perspective view in FIG. 5A and in plan view in FIG. 5B. Clamping plate 50 can be planar, formed from a flat metal sheet. Leaf springs 52 can be formed to extend along the periphery of filter 42 when seated within base frame 44 and to apply a nesting force against the filter 42 surface. According to an alternate embodiment, clamping plate 50 can include wave springs for applying the nesting force, wherein the wave springs are similarly coupled with spheres to provide the three single-point surface contact points, as described previously.

Figure 5C:
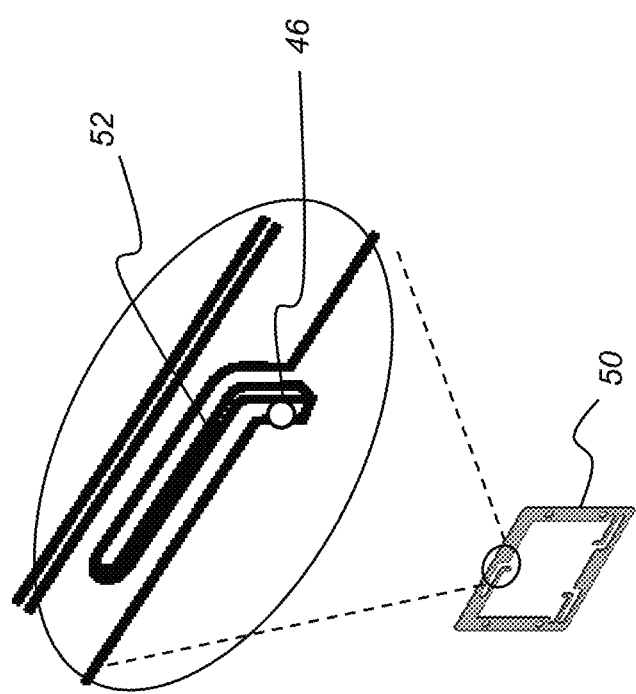
FIG. 5C is a perspective view that shows the configuration of a leaf spring for clamping.

In order to maintain surface flatness of the optic without over-constraint, the applied nesting force that holds filter 42 in place provides point contact using opposed, paired spheres S1A/S1B, S2A/S2B, S3A/S3B. As shown in enlarged view in FIG. 5C, each leaf spring 52 has a corresponding sphere 46 coupled to the leaf spring 52 by an adhesive or by other fastening mechanism. With respect to the schematic arrangement of FIG. 4B, spheres 46 that extend from clamping plate 50 correspond to spheres S1B, S2B, and S3B that, given nesting force from flexure at each leaf spring 52, each provide single-point contact against opposite surfaces of filter 42 or other optical component surface to provide clamping action between clamping plate 50 and base frame 44. The applied nesting force is orthogonal to the clamping plate 50.

Figure 5D:
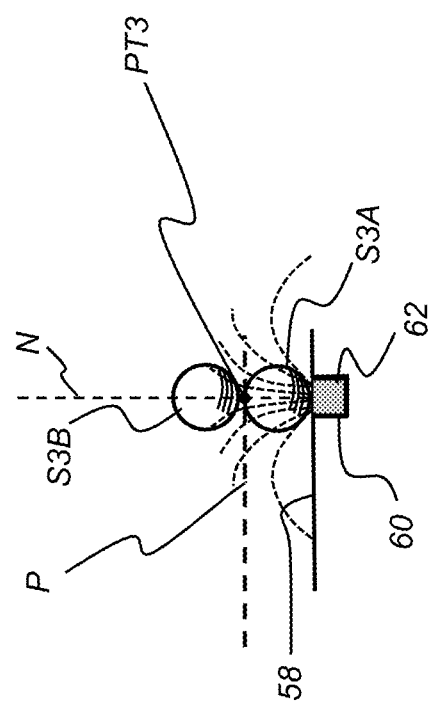
FIG. 5D is a side view that shows a magnetic mechanism for providing coupling and alignment of spheres according to an embodiment of the present disclosure.

The side view of FIG. 5D shows a mechanism for optionally providing coupling and alignment of spheres according to an embodiment of the present disclosure. Spheres S3A and S3B are formed from a magnetic material. A magnet 62 is fitted into recess 60 and provides a holding force that also helps to align spheres S3A and S3B along normal N. Normal N extends through point of contact PT3 along plane P in the example shown.

Spheres 46 and base frame 44 can be formed from stainless steel or other material that maintains suitable dimensional stability under changing temperature conditions. Spheres 46 can be stainless steel bearings, for example.

Clamping plate 50 can be formed from spring steel or other suitable metal.

Assembly of mount 40 is straightforward and can use screws or other fasteners, magnetism, or external clamping devices, for example.

Figure 6B:
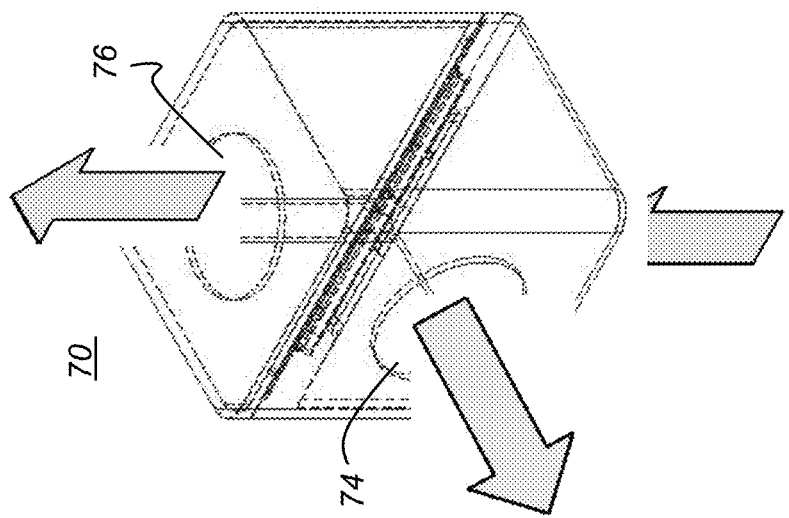
FIGS. 6A-6D show an embodiment of the optical mount within a microscope cube.
Figure 6A:
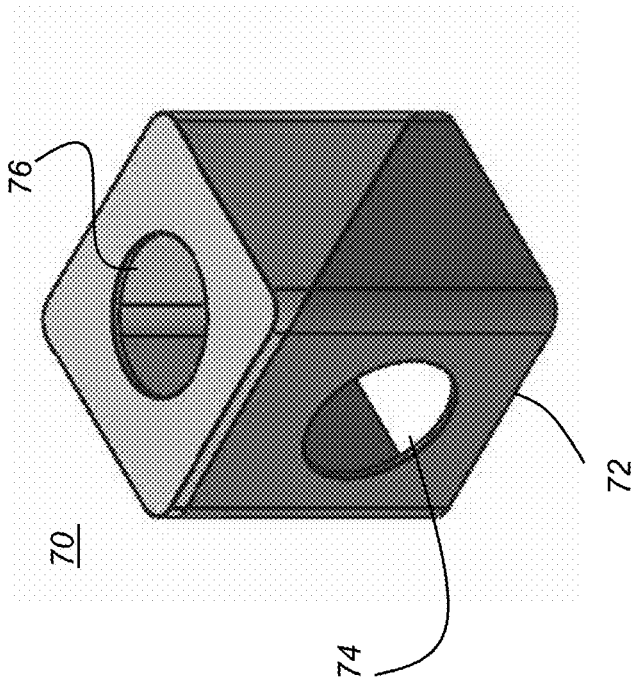
Figure 6C:
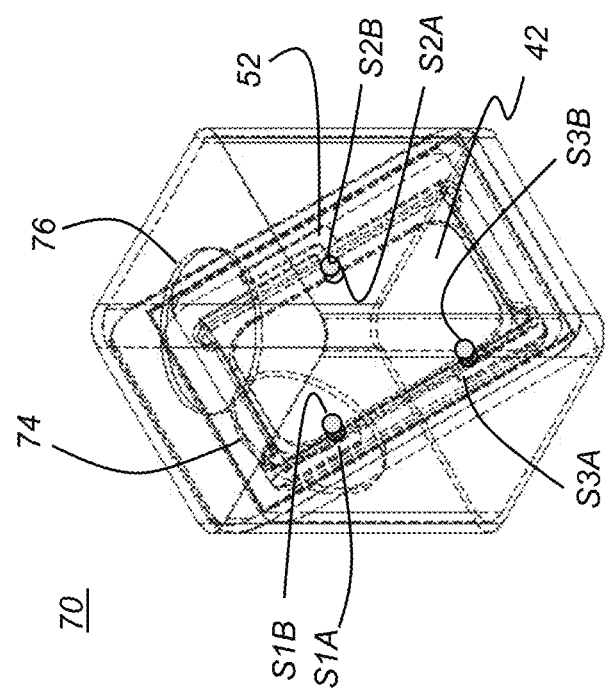
Figure 6D:
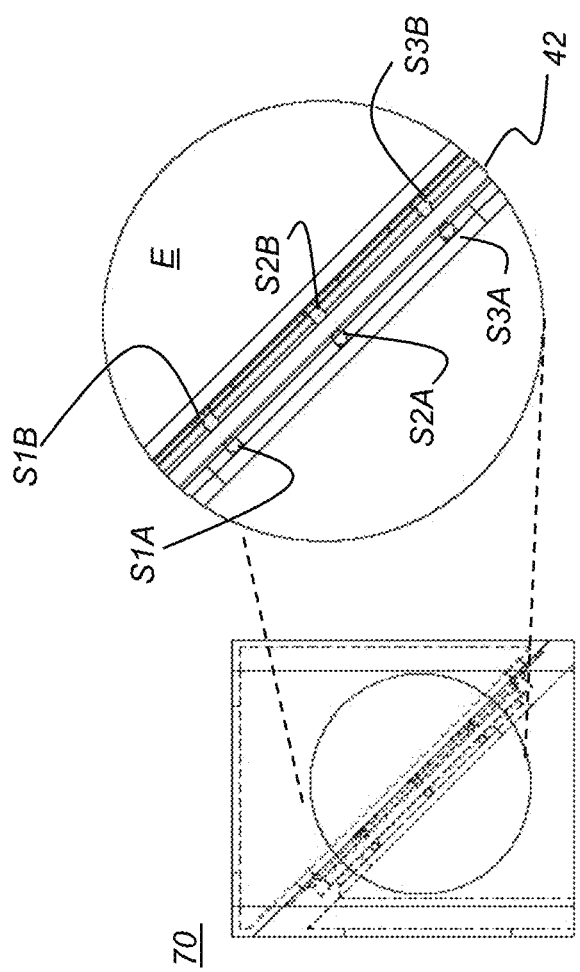

FIGS. 6A through 6D show an alternate embodiment of the present disclosure in which a microscope cube 70 includes the frame for the optic. In the embodiment shown, cube 70 has an open side 72 and apertures 74, 76. In FIGS. 6C and 6D, the pairs of opposed spheres S1A/S1B, S2A/S2B, S3A/S3B that provide the contact points are indicated. FIG. 6D shows a side view of cube 70 with an enlarged area E. As with the arrangement shown in previous figures, filter or other optic 42 is constrained at fixed contact points defined between three sets of opposed spheres S1A/S1B, S2A/S2B, S3A/S3B.

The method of the present disclosure offers particular advantages for providing optical elements with very flat dichroic surfaces that are used in both transmission and reflection, wherein incident light is directed at an oblique angle. This includes providing dichroic beam splitter devices for optical systems such as that described with reference to FIG. 1, for example. For such applications, it is generally most advantageous to position the dichroic surface directly in the path of incident light, without encasing the coated surface within a prism or plate, such as having the dichroic surface sandwiched between two substrates. Flatness tolerances to within 0.1 wavelength can be provided for a thin, flat optic such as dichroic filter 42 using the mount apparatus of the present disclosure. By maintaining such tight tolerance, the apparatus described herein reduced transmitted wavefront error (TWE) for transmitted light.

It should be noted that the surface flatness tolerance has its most pronounced impact on reflection of light in the optical path. Reflected wavefront error (RWE) is proportional to twice the flatness deviation, times $\cos \theta$ wherein $\theta$ is the angle of incidence. Thus, for example, constraining flatness to within 0.1 wavelength yields a proportional RWE of 0.2 times $\cos \theta$ wavelengths. For a dichroic beam splitter in an optical apparatus, for example, unwanted curvature of the surface can cause a shift of the focal plane and can alter the intended size or shape of the focused spot. Thus, the apparatus of the present disclosure can help to improve optical performance where thin reflective optics are used.

Again, it should be noted that, while the present disclosure describes mounting of a filter, the apparatus of the present disclosure can be used in similar fashion for mounting any of a number of types of optics having a flat surface. The mounted filter or other optic has at least one flat surface and can have any suitable outline. The outline can have any arrangement of curved or straight edge segments, such as having the generally rectangular outline shown in figures herein, or having a circular or elliptical outline, for example.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. The mount apparatus of the present disclosure is described herein for mounting a dichroic filter, but can be used in a similar manner for any of a number of types of flat optics.

The invention claimed is:

1. An optical apparatus comprising:
   an optic having a first flat surface and a second surface opposite the first flat surface;
   a frame having a first fixed contact point, a second fixed contact point, and a third fixed contact point that extend from the frame,
   wherein the first surface of the optic seats against the first, second, and third fixed contact points; and
   a planar clamping plate that is formed as a flat sheet enclosing an aperture having a periphery, wherein the clamping plate has:
   a first spring element that is formed to extend along the aperture periphery and configured to urge a first single-point contact toward the first fixed contact point;
   a second spring element that is formed to extend along the aperture periphery and configured to urge a second single-point contact toward the second fixed contact point;
   a third spring element that is formed to extend along the aperture periphery and configured to urge a third single-point contact toward the third fixed contact point.

2. The apparatus of claim 1 wherein the optic is a mirror.

3. The apparatus of claim 1 wherein the optic is a filter.

4. The apparatus of claim 1 wherein the optic has a curved outline.

5. The apparatus of claim 1 wherein the optic has an outline with one or more straight segments.

6. The apparatus of claim 1 wherein the optic is a diffraction grating.

7. The apparatus of claim 1 wherein the first, second, and third contact points are defined along spherical surfaces.

8. The apparatus of claim 1 further comprising at least one magnet on the clamping plate or frame, wherein the magnet is disposed to align the first opposing contact point with the first fixed contact point.

9. The apparatus of claim 1 wherein the frame defines an aperture for component placement and wherein the combined clamping plate mounted to the frame surface and optic define a clear aperture that lies within the component placement aperture.

10. The apparatus of claim 1 wherein the frame is part of a microscope cube.

11. The apparatus of claim 1 wherein at least one of the first, second, and third spring elements is a leaf spring.

12. The apparatus of claim 1 wherein at least one of the first, second, and third spring elements is a wave spring.

13. A mounting apparatus comprising:
   a base frame having an inner shelf dimensioned to seat peripheral portions of an optical component having a first flat surface;
   a clamping plate that is formed as a flat sheet defining a periphery of an enclosed aperture and featured to fasten against the base frame and having a plurality of leaf springs, wherein each leaf spring applies a nesting force against a second flat surface of the seated optical component, wherein the second surface is opposite the first surface,
   wherein each of the plurality of leaf springs is formed to extend along the aperture periphery and each of the plurality of leaf springs urges a corresponding single spherical contact point against the second surface and wherein the inner shelf is featured to provide a corresponding contact point against the first surface opposing each spherical contact of the leaf springs, wherein each pair of opposing contact points on the first and second surfaces define a corresponding normal to the flat surfaces of the optical component.

14. The apparatus of claim 13 wherein the contact points are provided by spherical bearings coupled to the leaf springs and to the inner shelf.

15. The apparatus of claim 13 having three leaf springs.

16. The apparatus of claim 14 further comprising at least one magnet on the base frame, wherein the magnet is disposed to align opposing spherical contact points.

17. An optical mount comprising:
   a base frame that defines a clear aperture and that seats first, second, and third spherical features outside a clear aperture periphery, wherein each spherical feature has a surface that defines a point contact for a plane that extends across the clear aperture; and
   a planar clamping plate that is formed as a flat sheet enclosing the clear aperture, wherein the clamping plate is configured to apply a three-point nesting force against the first, second, and third spherical features, wherein the planar clamping plate has:
   a first spring element formed to extend outside the clear aperture in a direction parallel to the periphery of the clear aperture and configured to urge a first single-point contact toward the first spherical feature;
   a second spring element formed to extend outside the clear aperture in a direction parallel to the periphery of the clear aperture and configured to urge a second single-point contact toward the second spherical feature;
   a third spring element formed to extend outside the clear aperture in a direction parallel to the periphery of the clear aperture and configured to urge a third single-point contact toward the third spherical feature.

18. The mount of claim 17 wherein the spring elements are wave springs.

19. The mount of claim 17 wherein the base frame lies within a microscope cube.

20. The mount of claim 17 wherein the base frame has a planar spring plate that is identical in form to the planar clamping plate and wherein the spring plate and the planar clamping plate are spaced apart and sandwich an optic between them.

* * * * *